(12) United States Patent
Herrick

(10) Patent No.: US 10,935,735 B2
(45) Date of Patent: Mar. 2, 2021

(54) COMPACT UNIVERSAL MULTI-TERMINUS FIBER OPTIC CONNECTOR HAND TOOL ALONG WITH RELATED METHODS

(71) Applicant: United States of America as represented by the Secretary of the Navy, Arlington, VA (US)

(72) Inventor: James Alan Herrick, South Berwick, ME (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/219,945

(22) Filed: Dec. 14, 2018

(65) Prior Publication Data
US 2020/0310050 A1    Oct. 1, 2020

(51) Int. Cl.
*G02B 6/38* (2006.01)
(52) U.S. Cl.
CPC ......... *G02B 6/3894* (2013.01); *G02B 6/3826* (2013.01)
(58) Field of Classification Search
CPC .............................. G02B 6/3894; G02B 6/3826
See application file for complete search history.

(56) References Cited

U.S. PATENT DOCUMENTS 6,295,901 B1 * 10/2001 Mardirossian .......... B25B 13/48
81/119

OTHER PUBLICATIONS

Department of Defense "Fiber Optic Cable Topology Installation Standard Methods for Naval Ships (Connectors and Interconnections) / MIL-STD-2042-5B (SH)" Feb. 19, 2000.
Department of the Navy, Naval Sea Systems Command, "Performance Specification / MIL-PRF-28876E" Oct. 4, 2004, pp. 1-37 and 55-69.
DLA Land and Maritime, "Performance Specification / MIL-PRF-64266 w/Amendment 1" Oct. 18, 2011, pp. 1-55 and 66-85.

* cited by examiner

*Primary Examiner* — Sung H Pak
*Assistant Examiner* — Hoang Q Tran
(74) *Attorney, Agent, or Firm* — Portsmouth Naval Shipyard; Christopher A. Monsey

(57) ABSTRACT

The present invention relates to using a connector hand tool to allow for the safe and efficient assembly and disassembly of shipboard fiber optic coupling systems. The exemplary connector hand tools couples with a plug shell ring or receptacle's plug shell ring receiving portion of the multi-terminus fiber optic connector such that the plug shell or receptacle may be tightened or loosed relative to a backshell adapter/coupling nut of a given connector or receptacle without damaging the connector, contaminating a fiber optic element held within an exemplary coupling system, or injuring a user. The hand tool employs a design allowing it to interface with connectors of different sizes and types.

3 Claims, 13 Drawing Sheets

| Shell Size | Key and keyway arrangement | AR° Or AP° BSC | BR° Or BP° BSC | CR° Or CP° BSC | DR° Or DP° BSC | YP diameter | YR diameter |
|---|---|---|---|---|---|---|---|
| 11 | 1 | 95 | 141 | 208 | 236 | .559 (14.20) .551 (14.00) | .581 (14.76) .569 (14.45) |
| | 2 | 113 | 156 | 182 | 292 | | |
| | 3 | 90 | 145 | 195 | 252 | | |
| | 4 | 53 | 156 | 220 | 255 | | |
| | 5 | 119 | 146 | 176 | 298 | | |
| | 6 | 51 | 141 | 184 | 242 | | |
| 13 | 1 | 95 | 141 | 208 | 236 | .683 (17.35) .675 (17.14) | .705 (17.91) .693 (17.60) |
| | 2 | 113 | 156 | 182 | 292 | | |
| | 3 | 90 | 145 | 195 | 252 | | |
| | 4 | 53 | 156 | 220 | 255 | | |
| | 5 | 119 | 146 | 176 | 298 | | |
| | 6 | 51 | 141 | 184 | 242 | | |
| 15 | 1 | 80 | 142 | 196 | 293 | .855 (21.72) .847 (21.51) | .877 (22.28) .865 (21.97) |
| | 2 | 135 | 170 | 200 | 310 | | |
| | 3 | 49 | 169 | 200 | 244 | | |
| | 4 | 66 | 140 | 200 | 257 | | |
| | 5 | 62 | 145 | 180 | 280 | | |
| | 6 | 79 | 153 | 197 | 272 | | |
| 23 | 1 | 80 | 142 | 196 | 293 | 1.276 (32.41) 1.267 (32.18) | 1.301 (33.04) 1.288 (32.71) |
| | 2 | 135 | 170 | 200 | 310 | | |
| | 3 | 49 | 169 | 200 | 244 | | |
| | 4 | 66 | 140 | 200 | 257 | | |
| | 5 | 62 | 145 | 180 | 280 | | |
| | 6 | 79 | 153 | 197 | 272 | | |

*FIG. 5*

At Step 101, providing multi-terminus fiber optic connector assembly (e.g., Fig. 1, 1 or Fig. 2, 2) comprised of a plug shell 1A that is threadably coupled with a backshell adapter/coupling nut 4, wherein the plug shell is formed as a cylindrical body with an opening facing away from the plug shell 1A, wherein the plug ring 2A is further formed with a plurality of spaced apart keys extending radially away from the plug ring 2A, wherein the plurality of spaced apart keys comprises a master key that has a lateral width that is greater than the other said keys.

At Step 103, providing an exemplary hand tool 18A or 18B such as shown in Figs. 6A, 6B, etc and inserting the plug ring 2A section of the connector assembly 1 (or 2) into a correspondingly shaped and sized recess (e.g., 27A, 27B, 27C or 27D) that is formed in the hand tool 18A or 18B that is sized to slideably receive the plug ring 2A with said keys, wherein each recess is formed with a keystop extending into the recess from a sidewall surrounding the recess, wherein a diameter of the recess is sized to provide a clearance fit between the plug ring 2A and sides of the recess when the plug ring 2A keys are inserted adjacent to the recess's keystop (e.g., greater than dimension 11B, Fig. 4 to enable the clearance fit), wherein plug ring 2A is oriented for insertion into the recess whereby the plug ring 2A master key is inserted into the recess to a side of the keystop to enable rotation of the plug ring 2A counter clockwise such that a lateral side of the master key extending from the plug ring 2A will come into contact the keystop to prevents the plug ring 2A from further rotating within the recess.

At Step 105, providing a backshell adapter/coupling nut wrench that can circumferentially grip a backshell/adapter coupling nut 4 threadably coupled with the plug shell 1A. At Step 107, couple the backshell adapter/coupling nut wrench with the backshell adapter/coupling nut 4 of the multi-terminus fiber optic connector 1 or 2. At Step 109, applying rotational force to the backshell adapter/coupling nut 4 of the multi-terminus fiber optic connector 1 via the backshell adapter/coupling nut wrench, thereby rotationally moving the backshell adapter/coupling nut 4 of the multi-terminus fiber optic connector assembly 1 relative to the plug shell 1A and thereby removing the backshell adapter/coupling nut 4.

FIG. 11

At Step 202, providing an exemplary hand tool 18A or 18B such as shown in Figs. 6A-6G.

↓

At Step 203, providing a backshell adapter/coupling nut wrench formed to circumferentially grip and couple with a backshell/adapter coupling nut (e.g., 51A, 51B) such as used with the exemplary receptacle shown in Figs. 9A or 9B.

↓

At Step 204, coupling the exemplary hand tool 18A with the receptacle such that the engaging shaft or protrusion (one of 35A to 35D corresponding to a clearance fit diameter of the plug shell receiving structure 23 and keystops (one of 39A to 39D that is dimensioned to fit within the master keyway of the receptacle (e.g,. 21A) slideably is fitted or moved into the plug shell receiving structure 23 and keyway 21A thereby locking the hand tool 18A or 18B in relation with the receptacle so as to prevent the hand tool 18A, 18B, etc from rotationally moving with respect to the receptacle 42A (or 42B).

↓

At Step 205, coupling the backshell adapter/coupling nut wrench with the backshell adapter/coupling nut 51A, 51B, etc of the multi-terminus fiber optic connector including the receptacle 42A.

↓

At Step 206, applying rotational force to the backshell adapter/coupling nut 51A or 51B, etc of the multi-terminus fiber optic connector assembly while holding the hand tool 18A, 18B etc in a fixed position, thereby rotationally moving the backshell adapter/coupling nut 51A, 51B, etc of the multi-terminus fiber optic connector relative to the receptacle 42.

*FIG. 12*

COMPACT UNIVERSAL MULTI-TERMINUS FIBER OPTIC CONNECTOR HAND TOOL ALONG WITH RELATED METHODS

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,503) is assigned to the United States Government and is available for licensing for commercial purposes. Licensing and technical inquiries may be directed to the Technology Transfer Office, Naval Surface Warfare Center Crane, email: Cran_CTO@navy.mil

BACKGROUND AND SUMMARY OF THE INVENTION

The present invention relates to tools and methods usable to secure or manipulate coupling structures which have structures vulnerable to various types of damage arising from use of existing tools and methods, create a variety of risks of injury, require a multitude of different tools which increase difficulty for various tasks in different environments, are not ergonomically advantageous, and create difficulties in industrial process efficiency needs. In one example, embodiments of the invention are designed to manipulate a plug shell (e.g., see FIG. 1, 1A) or receptacle portion (FIG. 10) of a multi-terminus fiber optic connector assembly (e.g., FIG. 1, 1; FIG. 2, 2) such that the backshell adapter/coupling nut (FIG. 1, 4) or a front adapter coupling ring (FIG. 2, 5) of a given connector assembly 1 (FIG. 1, 1A, 4; FIG. 2, 1B, 5) may be tightened or loosened relative to the plug shells (e.g, FIGS. 1 and 2, 1A, 1B); or alternatively removing backshell adapter/coupling nut from a fiber optic wall mount receptacle (FIG. 10A), or a fiber optic jam nut receptacle (FIG. 9B) portion without damage to the connectors.

In one example, in the course of building, testing, and repair of shipboard fiber optic systems that employ M28876 (FIG. 1) or M64266 (FIG. 2) ruggedized multi-terminus fiber optic connectors that includes a fiber optic plug shell 1A, 1B, there is a need to assemble or disassemble these connector assemblies 1, 2. FIG. 1 shows a side view of a M28876 plug shell 1A and backshell adaptor/coupling nut 4 which must be assembled or disassembled from each other. FIG. 2 shows a side view of a M64266 connector 1B and front adapter coupling ring 5.

In both FIGS. 1 and 2, the plug shell 1A, 1B each includes a plug shell ring 2A, 2B that is circumferentially surrounded by a knurled coupling nut 3A, 3B. Each plug shell 1A, 1B is threaded on a rear section (e.g., FIG. 2, 7B; FIG. 3, 7A) and allows connection of the plug shell 1A, 1B respectively to the backshell adapter/coupling nut 4 or front adapter coupling ring 5. One end or a mating end of the plug shells 1A or 1B forms a circular outer plug shell ring 2A, 2B that extends away from a body of the plug shells 1A, 1B. Around a circumference of the plug shell ring 2A, 2B there are as many as five plug shell key protrusions (e.g., FIG. 1, 6, 6A) that extend back the outer circumference of the plug shell ring 2A, 2B. There is always one master key plug shell protrusion 6, 6' on the plug shell ring 2A, 2B. The master key plug shell protrusion 6, 6' is wider than the other plug shell protrusions (e.g., 6A) and will only fit in the mating master key slot (e.g., FIG. 9A, 21) in a mating receptacle (e.g. FIGS. 9A, 9B). A placement of the protrusions 6, 6', 6A allow for unique keying of the connectors (e.g., FIGS. 1-3). The exemplary backshell adapter/coupling nut 4 or front adapter coupling ring 5 internal threads (not shown) engage the plug shell 1A, 1B external threads 7A, 7B. The backshell adapter/coupling nut 4 or front adapter coupling ring 5 provides a means by which to attach a backshell or backshell accessory (not shown)(e.g., a cylindrical or enclosing structure that couples with the backshell adapter/coupling nut 4 which provides strain relief for the fiber optic cable). The knurled coupling nut 3A, 3B is formed with a gap (e.g., FIG. 1, 3C) between the knurled coupling nut 3A, 3B cylindrical inner wall 3D and an outer cylindrical wall of the plug shell ring 2A, 2B that is surrounded by the knurled coupling nut 3A, 3B. The knurled coupling nut 3A, 3B cylindrical inner wall 3D is formed with internal facing threads (not shown in FIGS. 1-3, but can be seen in FIG. 7) that engages with external facing threads 47A, 47B of a mating connector structure of the receptacle (FIGS. 9A, 42A; FIG. 9B, 42B). In other words, the knurled coupling nut 3A, 3B is threaded on the inside; and when the plug shell 1A or 1B is inserted into the externally threaded shell of receptacle 42A, 42B, the knurled coupling nut 3A, 3B is threaded onto the receptacle 42A, 42B, providing an aligned and secure connection. The backshell adapter/coupling nut 4 or front adapter coupling ring 5 is sometimes provided with two flats or flat sections formed on their external surfaces at 180 degrees from each other for the purpose of allowing manipulation by a flat wrench, and sometimes is provided with two recesses 180 degrees from each other for the purpose of allowing manipulation with a specially designed "C" wrench.

FIG. 3 shows an isometric view of a plug shell 1A knurled coupling nut 3A and the plug shell 1A external threads 7A. The FIG. 3 drawing is shown with the backshell adapter/ coupling nut 4 removed.

FIG. 4 shows front-facing views of the exemplar FIG. 1 or 2 plug shells 1A, 1B and a receptacle 42, and positions of the different keying variations. FIG. 5 shows a non-exhaustive chart of shell sizes and key arrangements. A number of possible key positions presents a challenge to the design of a universal tool that will work with all keying arrangements. Specifically, this page is from the M28876 standard, and demonstrates the keying available for the plug shell 1 and receptacle 42. FIG. 5 shows exemplary plug shell (YP) external plug maximum and minimum external diameters (e.g., see FIG. 4, 11B) and receptacle (YR) maximum and minimum internal cavity diameters (e.g., see FIG. 4, 11A) which are used to design fit or clearance of an exemplary hand tool's circular shaped engaging protrusions (e.g., see FIGS. 6A-6F, 35A, 35B, 35C, and 35D). Different configurations of keyways 6, 6A are specified in FIG. 5. For example, the list of AR or AP BSCs state a number of degrees for non-master keyways with relation to the master key 6, 6' (e.g., first non-master key for a plug shell is 95 degrees from the master key 6, second non-master key for a plug shell is 141 degrees from the master key 6, and so on).

A number of problems have been encountered in attempting to assemble or disassemble various fiber optic connectors such as shown, e.g, in FIGS. 1-3. For example, technicians have attempted to use pliers to grip sections of these fiber optic connectors. Using pliers can easily damage the plug shell 1A, 1B or receptacle 42 or pinch the technician's hand. In addition to the safety aspect and the potential damage to the plug shell 1A, 1B or receptacle 42, another consideration is the cleanliness condition of the fiber optic ferrules 19 (FIG. 7) which are present in the plug shell 1A, 1B or receptacle 42. If the only available method of separating these components plug shell 1A from backshell adapter/coupling nut 4 or plug shell 1B from front adapter coupling ring 5 is to engage a mating plug shell or receptacle the technician must complete an inspection prior to mating a plug shell with a receptacle. When mating a plug shell or receptacle, a design of the plugs shells 1A, 1B or receptacle 42 is to provide a well-aligned physical connection between the fiber optic ferrules 19. Prior to mating, a technician will carefully inspect and, if necessary, clean and re-inspect every fiber ferrule to be sure that no foreign material exists before mating. This can be a time consuming process, as there may be as many as 62 ferrules in each connection (31 per side). If dirty ferrules are placed in contact with a clean one, then the clean ferrule is damaged and has to be repaired. Various embodiments of the invention avoid the need for this inspection because one does not need to engage the receptacle 42 with the plug shell in an attempt to use the receptacle 42A, 42B as a means of immobilizing the plug shells 1A, 1B so as to apply a torque to the backshell adapter coupling nut 4 or front adapter coupling ring 5. The use of the connectors 42A, 42B to immobilize the plug shells 1A, 1B is considered an improper method of assembly or disassembly because this can lead to damage the ferrules due to a potential for either the receptacle 42A, 42B or the plug shell 1A, 1B having dirty optical ferrules inside of them. Use of the invention avoids any contact with any of the ferrules as well as avoids or reduces potential for damage from rotational force or use of unauthorized tools such as pliers etc.

BRIEF DESCRIPTION OF THE DRAWINGS

The detailed description of the drawings particularly refers to the accompanying figures in which:

FIG. 5 shows exemplary keying arrangements for the exemplary M28876 plug shell;

FIG. 11 shows an exemplary method in accordance with one embodiment of the invention; and FIG. 12 shows an exemplary method in accordance with one embodiment of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 6A:
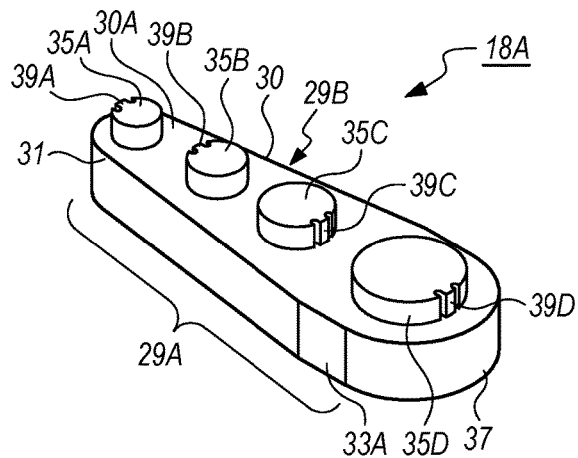
FIGS. 6A-6D show isometric views of several exemplary embodiments of an exemplary compact universal multi-terminus fiber optic connector hand tool.
Figure 6B:
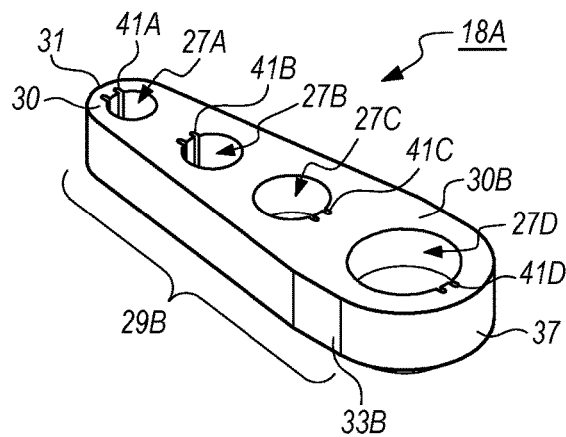
Figure 9A:
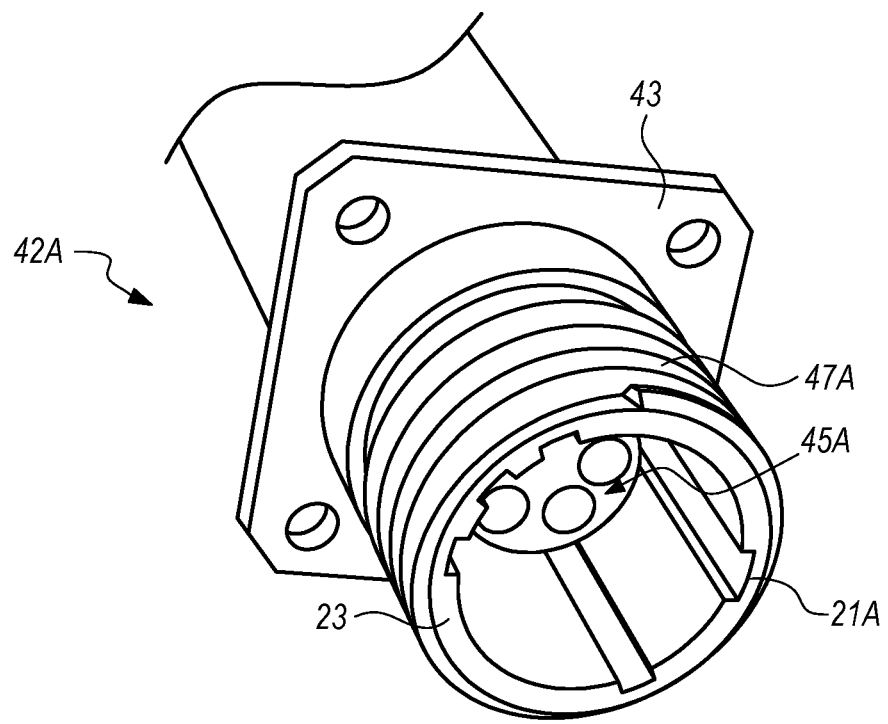
FIG. 9A shows a view of an exemplary M28876 wall mount receptacle.
Figure 9B:
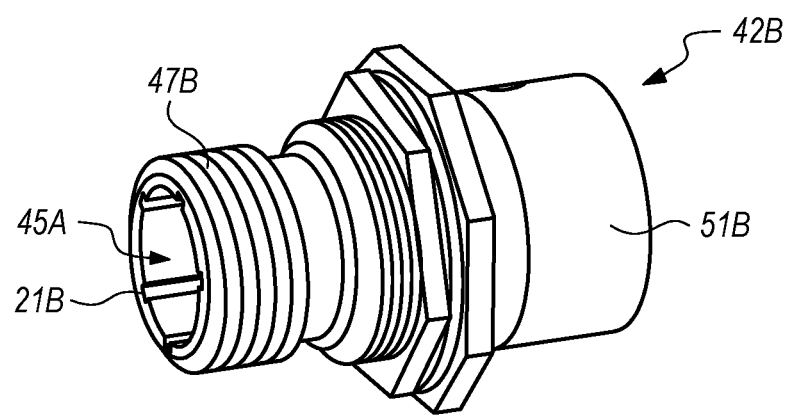
FIG. 9B shows a view of an exemplary M28876 jam nut receptacle.

FIGS. 6A and 6B respectively shows top and bottom isometric views of one embodiment of an exemplary compact universal multi-terminus fiber optic connector hand tool. Note the use of spatial references of top and bottom views here is an arbitrary reference used for convenience as both sides of the exemplary hand tools 18A, 18B are usable in different orientations. FIG. 6A shows the hand tool 18A with an elongated tapered body 30 that is provided with a first side 30A (arbitrarily shown in the FIG. 6A top view) and an opposing second side 30B (arbitrarily shown in the FIG. 6B bottom view). The hand tool 18A further is formed with a first lateral side section 29A and an opposing second lateral side section 29B that are both adjacent to the first side 30A and second side 30B. The first side 30A is formed with set of circular shaped engaging shafts or protrusions 35A, 35B, 35C, and 35D which extend away from the first side 30A. Each of the circular shaped engaging shafts or protrusions 35A, 35B, 35C, and 35C are generally shaped with different diameters that are each formed to have a non-interference clearance fits between differently sized receptacle 42A, 42B cavities 45A, 45B (FIG. 9A). Each circular shaped engaging shafts or protrusions 35A, 35B, 35C, and 35D is respectively formed with a keystop 39A, 39B, 39C, and 39D extending away from a lateral side of each engaging shafts or protrusions 35A, 35B, 35C, 39D that is formed to slip into a respective receptacle's (e.g., FIG. 9A, 42A; FIG. 9B, 42B) master keyway 21A or 21B. A height of each engaging shaft or protrusion 35A, 35B, 35C, 39D is formed such upper surface of each engaging shaft or protrusion 35A, 35B, 35C, 35D does not come into contact with a fiber optic ferrule 19 (FIG. 7) within a receptacle 42A, 42B (to avoid damaging or contaminating a given ferrule 19).

Figure 1:
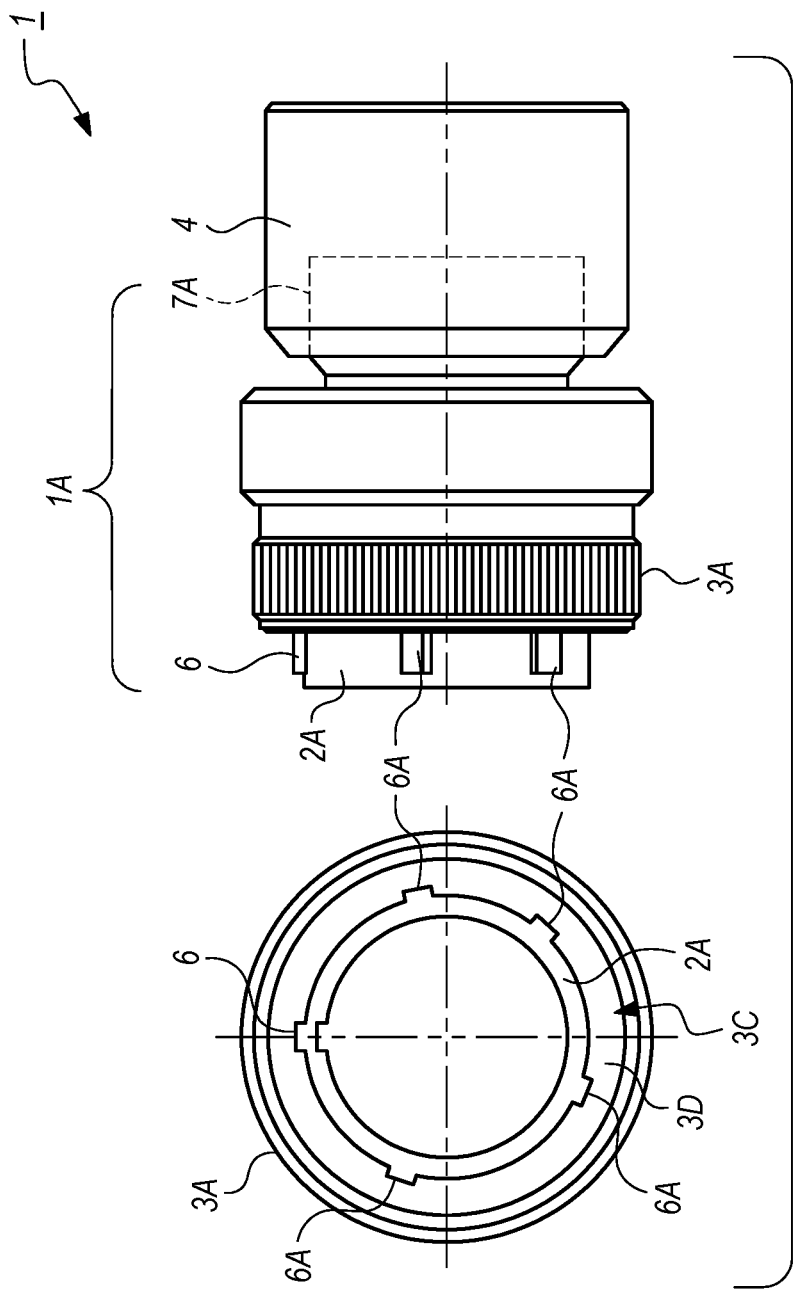
FIG. 1 shows a view of an exemplary fiber optic M28876 plug shell and backshell adaptor/coupling nut.
Figure 2:
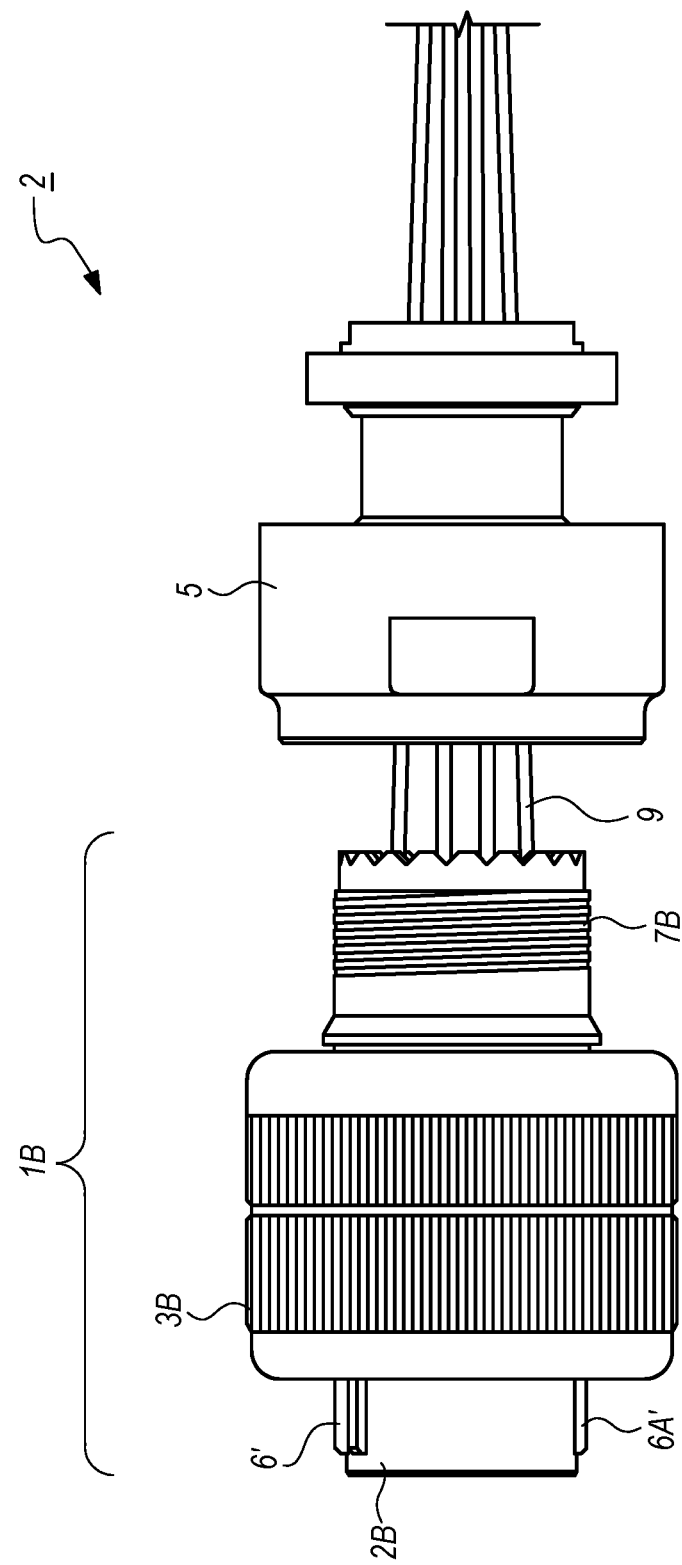
FIG. 2 shows a view of an exemplary fiber optic M64266 connector and front adapter coupling ring.
Figure 3:
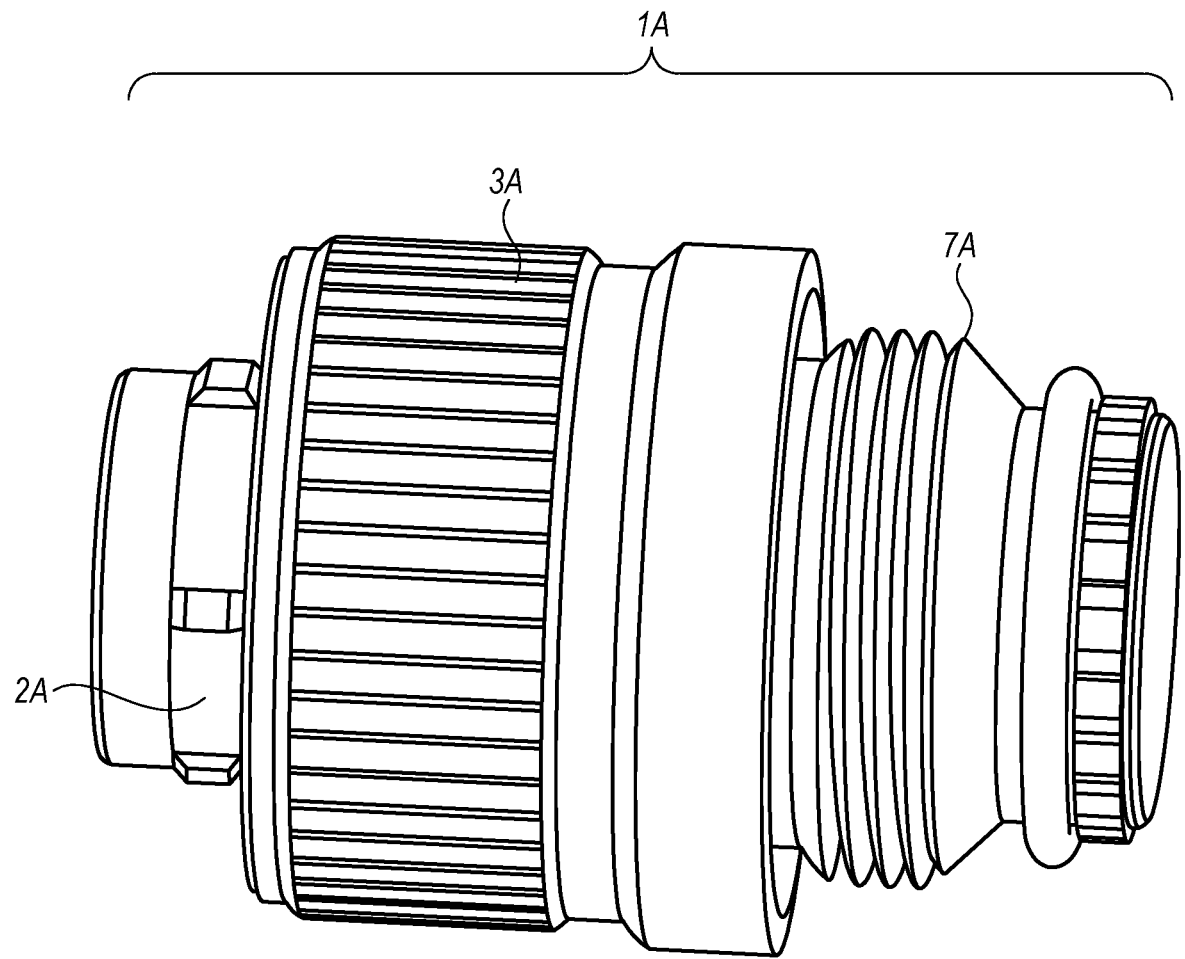
FIG. 3. shows an exemplary M28876 plug shell with the backshell adaptor/coupling nut removed.

Each opposing side 29A, 29B of the engaging shafts or protrusions 35A, 35B, 35C, 39D respectively have a flat section 33A, 33B which allow the exemplary compact universal multi-terminus fiber optic connector hand tool 18A or 18B to inserted into an adjustable vise or other immobilizing structure that has parallel gripping or clamping structures (not shown) that apply a force to each of the flat sections 33A, 33B. Insertion into such a vise or immobilization structures allow a technician or user to apply greater two handed manual force to disassemble either a receptacle 42A, 42B or a fiber optic connector such as shown in FIGS. 1-3. For example, disassembly can include inserting the hand tool 18A or 18B with respective engaging shaft or protrusion into the receptacle cavity 45A, 45B, etc and applying rotational force thereby unscrewing (or alternatively coupling) a given exemplary fiber optic connector, e.g., M28876 plug shell 1A, from (or with) its corresponding backshell adaptor/coupling nut 4; or alternatively assembling or disassembling the M64266 connector 1B from a corresponding front adapter coupling ring 5. The key stops 39A, 3B, 39C, and 39D extending from the engaging shafts or protrusions 35A, 25B, 35C, or 39D respectively engage with a corresponding master keyway 21A, 21B in a given exemplary fiber optic receptacle 42A, 42B and thereby enable a technician to apply a rotational force to apply needed torque to disassemble or assembly a given receptacle.

Referring to FIG. 6B, the second side 30B of the exemplary hand tool is shown which is formed with a series of spaced apart circular recesses 27A, 27B, 27C, and 27D which each are sized to receive a particular exemplary plug shell ring 2A, 2B (e.g., FIGS. 1-3). The circular recesses 27A, 27B, 27C, and 27D each have a diameter which corresponds to a diameter of a respective different plug shell ring, e.g., FIG. 1, 2A measured from an outwardly facing side of plug shell ring 2A, 2B keys 6, 6A or 6', 6A so that a respective plug ring 2A, 2B, etc will fit into a corresponding circular recess 27A, 27B, 27C, and 27D. Each recess 27A, 27B, 27C, and 27D is further formed with a respective keystop 41A, 42B, 41C, 41D which each extends inwardly from a respective sidewall of a respective recess 27A, 27B, 27C, and 27D. Each respective keystop 41A, 42B, 41C, 41D is sized to engage with a respective master key 6, 6' etc such that after insertion of a given plug shell ring 2A, 2B into a respective recess 27A, 27B, 27C, and 27D the respective plug shell ring 2A, 2B, etc is held in position such that it does not rotate within a respective recess 27A, 27B, 27C, and 27D if a rotational force is applied to it.

The exemplary hand tool's recesses 27A, 27B, 27C, and 27D have different diameters where a largest diameter recess 27D is located nearest to one rounded end 37 of the hand tool 18A or 18B and the hand tool's recess 27A having a smallest diameter is located nearest to an opposing rounded end 31 of the hand tool. Hand tool recesses 27B, 27C having intermediate diameters sized greater than the smallest recess 27A and lesser than the largest recess 27D are situated between the hand tool recesses 27A and 27D having the largest and smallest diameters.

Figure 6C:
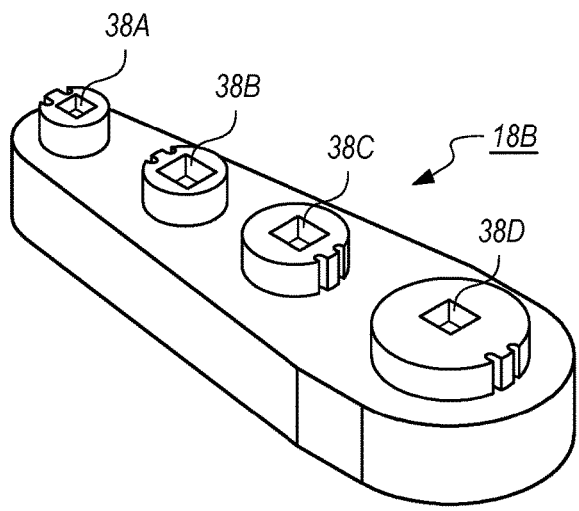
Figure 6D:
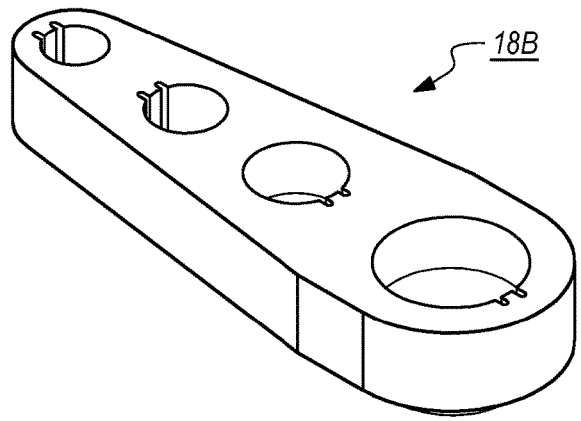

FIG. 6C shows an top isometric view of an alternative embodiment of the hand tool invention with socket head recesses 38A, 38B, 38C, 38D respectively formed into a center section of each of an outward facing surface of each of the engaging shafts or protrusions 35A, 35B, 35C, 35D. These socket head recesses, e.g., 38A, are formed to receive a socket head or a coupling section of a torque wrench that can be applied to a given embodiment of the hand tool 18B which is useful in assembling plug shells 1A, 1B. Specific torque can be applied using this embodiment to ensure optical connectors are not overtightened. FIG. 6D shows a bottom view of the exemplary hand tool 18B that is shown as essentially identical to the tool 18A shown in FIG. 6B. However, each of the recesses 27A-27D can have a socket head recess similar to those shown in FIG. 6C to enable similar use of a torque wrench to apply a particular torque to a receptacle 42A, 42B, etc.

Figure 6E:
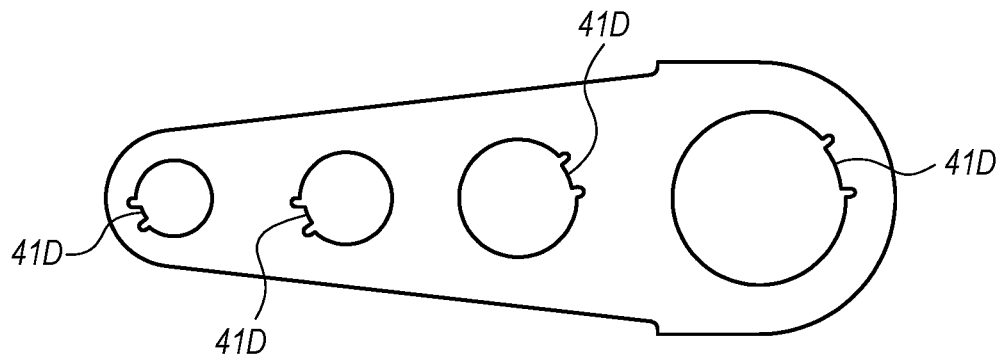
FIGS. 6E and 6F show faces of an exemplary compact universal multi-terminus fiber optic connector hand tool.

FIG. 6E shows a view of the FIG. 6B hand tool embodiment 18A second side 30B showing dimensional examples of the keystops 41A, 41B, 41C, 41D and how they respectively slightly protrude or extend inwardly towards a center of recesses 27A-27D.

Figure 6F:
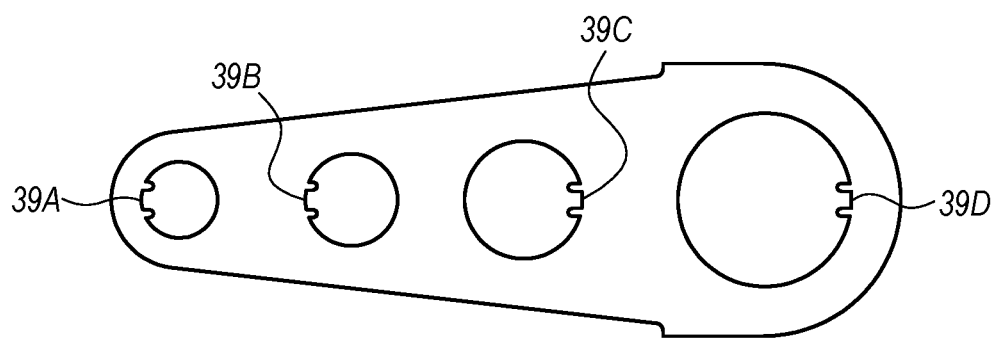

FIG. 6F shows the first side 30A of the FIG. 6A hand tool embodiment 18A where the engaging shafts or protrusions 39A-39D are shown in a profile view extending away from a lateral side of the engaging shafts or protrusions 39A-39D.

Figure 7:
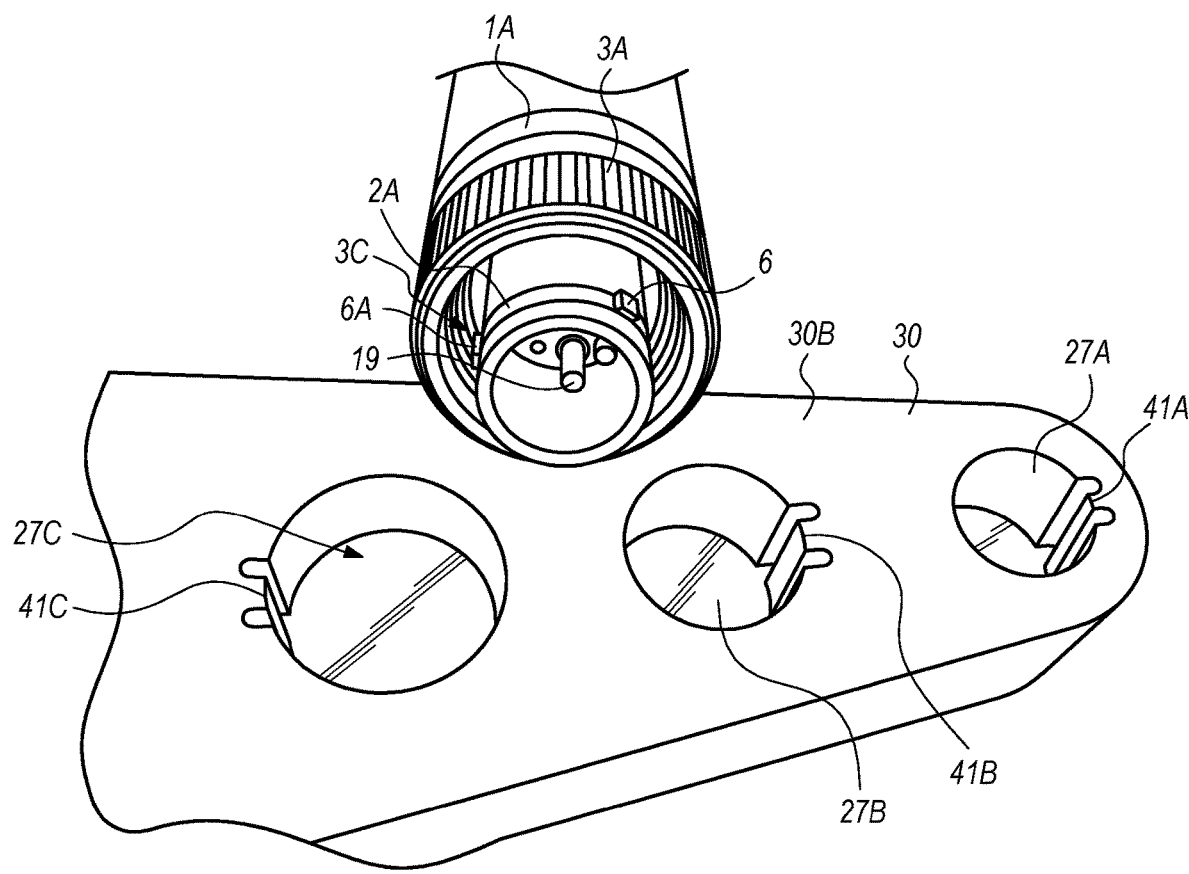
FIG. 7 shows an exemplary plug shell held in relation to an exemplary compact universal multi-terminus fiber optic connector hand tool.

FIG. 7 shows an exemplary embodiment of the hand tool 18A along with a perspective view of an exemplary fiber optic connector assembly 1 such as shown in FIG. 1. The exemplary fiber optic connector the fiber optic cable ferrules, e.g., 19, that are shown extending within a cavity formed within the plug shell. various embodiments of an exemplary hand tool, e.g., 18A, 18B, etc ensures that the fiber optic cable ferrules 19 do not sustain damage by means of coming in contact with a floor of a circular recess 27A-27D. Each circular recess, e.g., 27A-27D are formed with a depth that allows a given plug shell ring 2A, 2B, etc to be inserted up to a section of the plug shell adjacent to the plug shell ring 2A, 2B, e.g., the knurled coupling nut 9. When coupled to the hand tool 18A, 18B, etc, a section of a given exemplary plug shell ring 2A, 2B, etc is enclosed or surrounded by a correspondingly shaped exemplary hand tool recess 27A, 27B, 27C, or 27D. When a given exemplary plug shell ring 2A, 2B, etc is inserted into a correspondingly shaped or diameter dimensioned hand tool recess 27A, 27B, 27C, or 27C and turned, an exemplary plug shell master key 6 or 6' comes into contact with a respective keystop, e.g., 41A, 41B, 41C, or 41D of the hand tool 18A, 18B, etc, thereby arresting rotational motion of the exemplary plug shell ring 2A, 2B, thus allowing the plug shell housing 1A or 1B to be tightened or loosened from the backshell adapter/coupling nut 11 or front adapter coupling ring 5. In one exemplary embodiment of the invention, the keystops 41A, 41B, 41C, 41D contacts the plug shell ring's master key 6 to enable tightening or loosening of the plug shell 1A or 1B from the backshell adapter/coupling nut 11 or front adapter coupling ring 5 or equivalent. In other embodiments, the keystops 41A-41D can be formed to engage with any plug shell keys 6, 6A. However, given the master keys 6, 6' are larger (e.g. wider) than other keys 6A, more force can be applied to the master keys 6, 6' from a given tool 18A, 18B, etc embodiment and therefore it is preferable to size the engaging shafts or protrusions 41A-41D to engage with the exemplary master keys 6, 6'.

Figure 8:
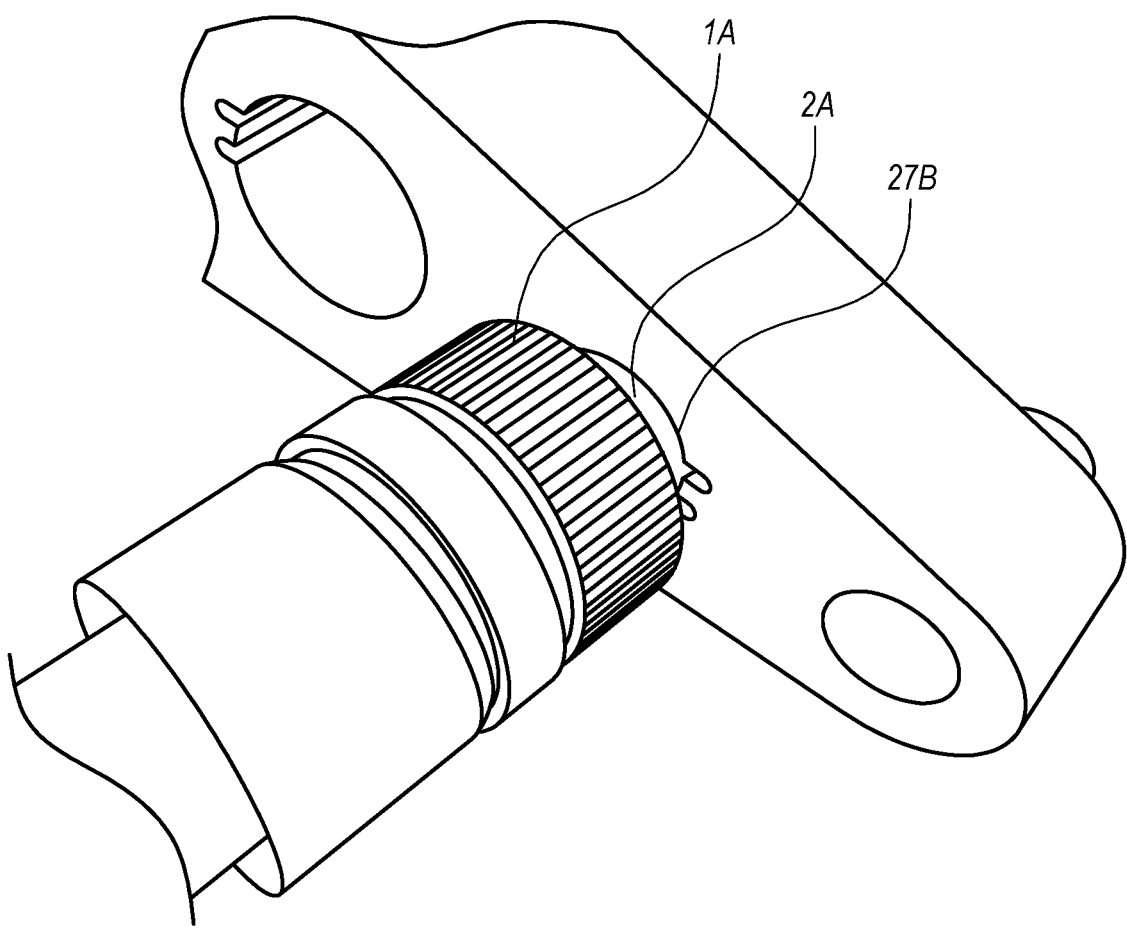
FIG. 8 shows a plug shell inserted into a face of a hand tool in which recesses are engaging in corresponding keyways of a body of an exemplary hand tool.

FIG. 8 shows another perspective view of an exemplary hand tool 18A, 18B, etc with an exemplary plug shell ring 1A partially inserted into one of the recesses 27B.

FIG. 9A shows an exemplary receptacle 42A with a mounting flange 43, a plug shell ring receiving structure 23 that forms an interior cavity where fiber optic receiving structures are disposed that couple with ferrules 19 from exemplary plug shell connectors 1, 2 etc. Threads 47A are formed into an outer surface of the plug shell ring receiving structure 23 that couple with corresponding threads formed onto an inwardly facing section of an exemplary knurled coupling nut 3A, 3B. A master keyway 21A is formed into an inwardly facing side of the plug shell ring receiving structure 23 running parallel to an axis running parallel with and through a center of the shell ring receiving structure 23. The master keyway 21 is formed with a corresponding width and depth to enable an exemplary plug shell ring 2A, 2B with its master key 6 or 6' to slideably insert with a clearance fit within the plug shell ring 2A, 2B.

FIG. 9B shows an alternative embodiment of a receptacle 42B with similar structures as is shown in FIG. 9A except that this embodiment is formed without the mounting flange 43 of FIG. 9A.

Figure 10:
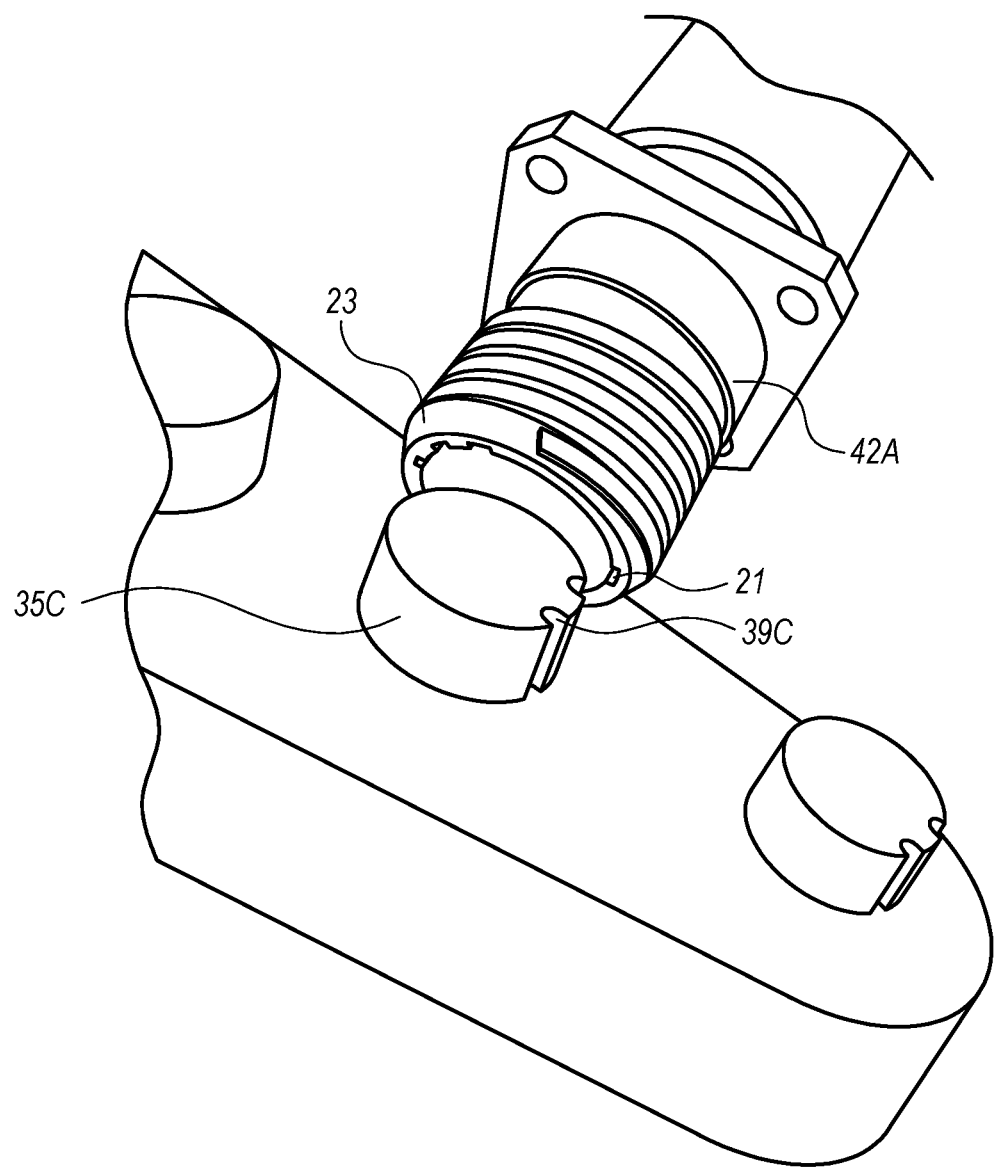
FIG. 10 shows an exemplary fiber optic cable receptacle inserted onto an exemplary compact universal multi-terminus fiber optic connector hand tool.

FIG. 10 shows the exemplary FIG. 9A receptacle 42A being positioned relative to one of the engaging shafts or protrusions 35C shown in FIG. 6A hand tool embodiment 18A. This figure shows the keystop 39C positioned relative to the master keyway 21 formed in the inwardly facing sidewall of the shell ring receiving structure 23 of receptacle 42A. This figure gives an impression on how the receptacle 42A is slid into the engaging shaft or protrusion 35C and thereby locked in place from rotational forces.

Figure 4:
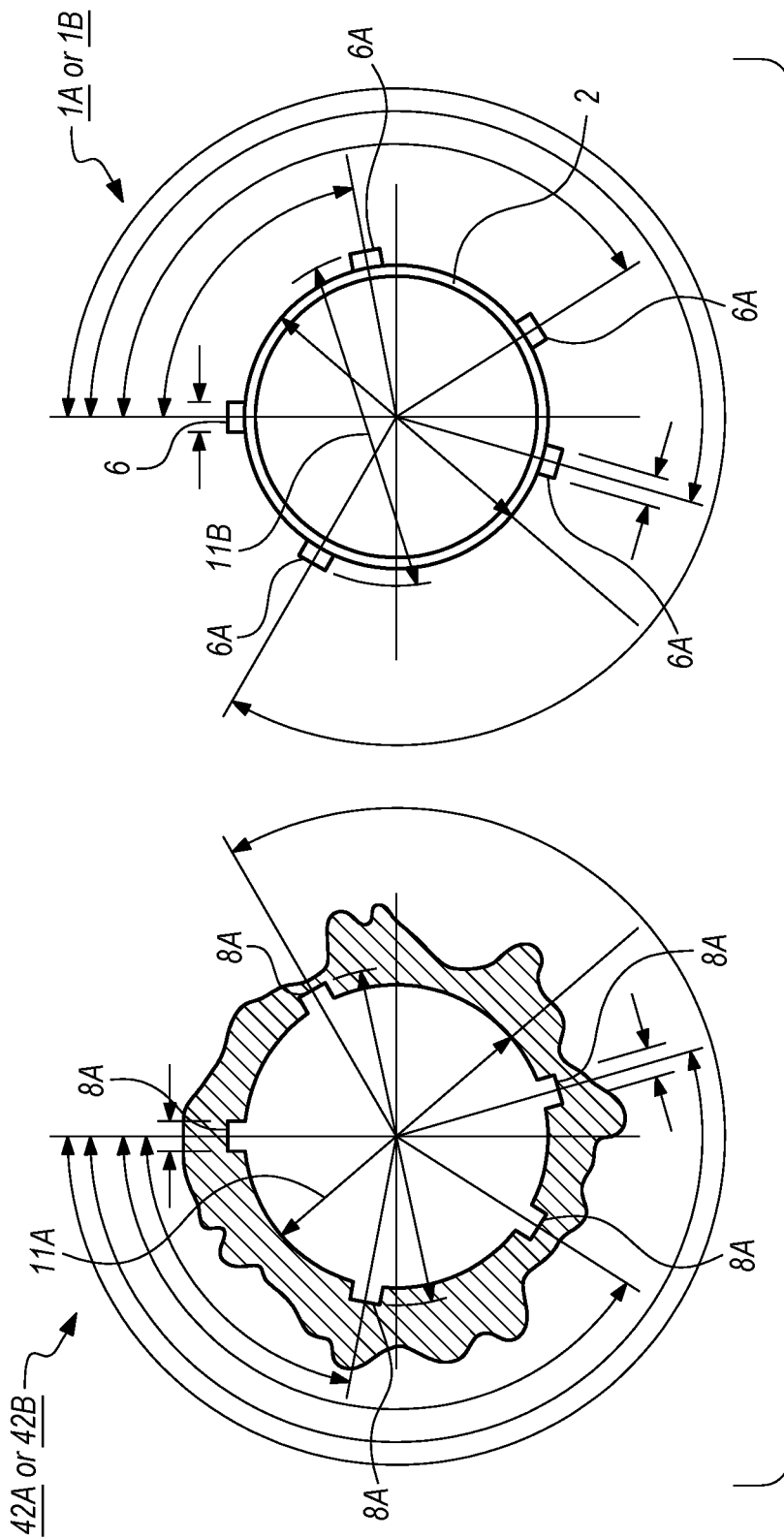
FIG. 4 shows exemplary keyway spacing for an exemplary fiber optic cable plug shell and receptacle.

FIG. 11 shows a method of using an exemplary hand tool such as shown in FIG. 6A or 6B to dissemble a multi-terminus fiber optic connector assembly (e.g., FIG. 1, 1 or FIG. 2, 2) comprised of a plug shell 1A that is threadably coupled with a backshell adapter/coupling nut 4, wherein the plug shell is formed as a cylindrical body with an opening facing away from the plug shell 1A, wherein the plug ring 2A is further formed with a plurality of spaced apart keys extending radially away from the plug ring 2A, wherein the plurality of spaced apart keys comprises a master key that has a lateral width that is greater than the other said keys. At Step 101, providing the multi-terminus fiber optic connector. At Step 103, providing an exemplary hand tool 18A or 18B such as shown in FIGS. 6A, 6B, etc and inserting the plug ring 2A section of the connector assembly 1 (or 2) into a correspondingly shaped and sized recess (e.g., 27A, 27B, 27C or 27D) that is formed in the hand tool 18A or 18B that is sized to slideably receive the plug ring 2A with said keys, wherein each recess is formed with a keystop extending into the recess from a sidewall surrounding the recess, wherein a diameter of the recess is sized to provide a clearance fit between the plug ring 2A and sides of the recess when the plug ring 2A keys are inserted adjacent to the recess's keystop (e.g., greater than dimension 11B, FIG. 4 to enable the clearance fit), wherein plug ring 2A is oriented for insertion into the recess whereby the plug ring 2A master key is inserted into the recess to a side of the keystop to enable rotation of the plug ring 2A counter clockwise such that a lateral side of the master key extending from the plug ring 2A will come into contact the keystop to prevents the plug ring 2A from further rotating within the recess. At Step 105, providing a backshell adapter/coupling nut wrench that can circumferentially grip a backshell/adapter coupling nut 4 threadably coupled with the plug shell 1A. At Step 107, couple the backshell adapter/coupling nut wrench with the backshell adapter/coupling nut 4 of the multi-terminus fiber optic connector 1 or 2. At Step 109, applying rotational force to the backshell adapter/coupling nut 4 of the multi-terminus fiber optic connector 1 via the backshell adapter/coupling nut wrench, thereby rotationally moving the backshell adapter/coupling nut 4 of the multi-terminus fiber optic connector assembly 1 relative to the plug shell 1A and thereby removing the backshell adapter/coupling nut 4.

FIG. 12 shows an exemplary method of using an exemplary hand tool 18A such as shown in FIGS. 6A-6F to disassemble (or alternatively assemble) an exemplary multi-terminus fiber optic connector section formed as a receptacle 42A (or 42B) and backshell adapter/coupling nut 51A (or 51B) such as shown in FIG. 9A or 9B. At Step 201, providing the exemplary FIG. 9A or 9B receptacle. At Step 202, providing the exemplary hand tool 18A or 18B such as shown in FIGS. 6A-6F. At Step 203, providing a backshell adapter/coupling nut wrench (not shown in a figure) that can circumferentially grip and couple with a backshell/adapter coupling nut (e.g., 51A, 51B) such as used with the exemplary receptacle shown in FIG. 9A or 9B. At Step 204, coupling the exemplary hand tool 18A with the receptacle such that the engaging shaft or protrusion (one of 35A to 35D corresponding to a clearance fit diameter of the plug shell receiving structure 23 and keystops (one of 39A to 39D that is dimensioned to fit within the master keyway of the receptacle (e.g., 21A) slideably is fitted or moved into the plug shell receiving structure 23 and keyway 21A thereby locking the hand tool 18A or 18B in relation with the receptacle so as to prevent the hand tool 18A, 18B, etc from rotationally moving with respect to the receptacle 42A (or 42B). At Step 205, coupling the backshell adapter/coupling nut wrench with the backshell adapter/coupling nut 51A, 51B, etc of the multi-terminus fiber optic connector including the receptacle 42A. At Step 206, applying rotational force to the backshell adapter/coupling nut 51A or 51B, etc of the multi-terminus fiber optic connector assembly while holding the hand tool 18A, 18B etc in a fixed position, thereby rotationally moving the backshell adapter/coupling nut 51A, 51B, etc of the multi-terminus fiber optic connector relative to the receptacle 42.

Note that the methods of in this application assume right hand threads associated with the various connectors. If left hand threads are used, then orientation of the master key with respect to insertion into the recess in relation to the keystop will be changed accordingly to enable rotational contact of the master key with the keystop.

A method of using an exemplary hand tool such as shown in FIGS. 6A, 6B to complete assembly of a multi-terminus fiber optic connector assembly (e.g., FIG. 1, 1 or FIG. 2, 2) with a plus ring 2A uses the same or similar steps as in FIG. 10 with some changes. For example, a user will insert the plug ring 2A such that a master key of this plug ring 2A is aligned so that when the plug ring is rotated clockwise, the master key will come into contact with the plug ring 2A keystop. Assembly with respect to the receptacle calls for a clockwise rotation versus counter clockwise.

Additional embodiments use a torque wrench coupled with an embodiment such as shown in FIG. 6D. A torque wrench is coupled with the hand tool and then used to apply measured torque to the hand tool so as to tighten the plug shell 1A with respect to the backshell adapter coupling nut 4 for example.

Although the invention has been described in detail with reference to certain preferential embodiments, variations and modifications exist within the spirit and scope of the invention as described and defined in the following claims.

The invention claimed is:

1. A method of using a hand tool to couple or separate first and second multi-terminus fiber optic connectors, the method including the steps of:
   providing first and second multi-terminus fiber optic connectors, comprising a plug shell and backshell adapter/coupling nut and a receptacle and backshell adapter/coupling nut, respectively, wherein said plug shell is coupled to a first backshell adapter/coupling nut and is comprised of a plug shell housing, knurled coupling nut, fiber optic ferrules and plug shell ring having at least one plug shell key protrusion and wherein said receptacle is coupled to a second backshell adapter/coupling nut and is comprised of a flange, an insert having at least one insert cavity and receptacle screw threads forming a receptacle cavity and having at least one receptacle key cavity;
   providing a hand tool;
   providing a backshell adapter/coupling nut wrench able to circumferentially grip a backshell adapter/coupling nut;
   coupling the hand tool with said plug shell ring of said first multi-terminus fiber optic connector as to provide no damage to the fiber optic ferrules of said plug shell;
   rotating said hand tool until said plug shell is immobilized by a plug shell protrusion of said hand tool;
   coupling said backshell adapter/coupling nut wrench with said backshell adapter/coupling nut of said first multi-terminus fiber optic connector
   applying rotational force to the backshell adapter/coupling nut of the first multi-terminus fiber optic connector, thereby rotationally moving the backshell adapter/coupling nut of said first multi-terminus fiber optic connector relative to said plug shell;
   coupling the hand tool with said receptacle screw threads of said second multi-terminus fiber optic connector such that a receptacle protrusion of said hand tool is disposed into said receptacle cavity of said receptacle thereby causing said hand tool to immobilize said receptacle and as to provide no damage to said insert of said receptacle;

coupling said backshell adapter/coupling nut wrench with said backshell adapter/coupling nut of said second multi-terminus fiber optic connector; and applying rotational force to the backshell adapter/coupling nut of the second multi-terminus fiber optic connector, thereby rotationally moving the backshell adapter/coupling nut of said second multi-terminus fiber optic connector relative to said receptacle.

2. The method of claim 1 wherein said plug shell is immobilized by said hand tool and said hand tool is coupled to a vice.

3. The method of claim 1 wherein said receptacle is immobilized by said hand tool and said hand tool is coupled to a vice.

\* \* \* \* \*